Sept. 19, 1961          B. LONG          3,000,142

PROCESS FOR PRODUCING FLAT GLASS

Filed Feb. 16, 1959          2 Sheets-Sheet 1

INVENTOR:
Bernard Long

BY

AGENT.

United States Patent Office 3,000,142
Patented Sept. 19, 1961

3,000,142
PROCESS FOR PRODUCING FLAT GLASS
Bernard Long, Paris, France, assignor to Societe des Glaces de Boussois, Paris, France, a corporation of France
Filed Feb. 16, 1959, Ser. No. 793,442
Claims priority, application France Apr. 2, 1958
3 Claims. (Cl. 49—83.1)

My present invention relates to a process and an apparatus for producing sheets or strips of flat glass by drawing a vitreous material from a molten bath.

In conventional glass-drawing equipment, such as an apparatus of the Libbey-Owens type, the molten glass passes from the melting chamber proper of a tank furnace to a refining chamber and thence, under controlled thermal conditions, to a drawing chamber. The refining chamber, which generally contains a vitreous bath ranging in depth between about 120 and 150 cm. or roughly between 4 and 5 feet, is connected with the drawing chamber via a rather deep channel. At the entrance end of that channel, i.e. at that part of the refining chamber which is closest to the drawing chamber, the molten glass is no longer exposed to the flame of the furnace but, on the contrary, is subject to heat losses particularly by upward radiation toward the furnace roof. The resulting cooling effect establishes within the melt a zone of maximum temperature located at a certain level below the melt surface, usually at a depth of some 15 to 20 cm. (6 to 8 inches) from that surface. This zone, in turn, represents the lower boundary of a flow of molten glass, which may be referred to as the forward current, passing from the refining chamber toward the drawing chamber. Underneath this region the molten mass circulates in the opposite direction so as to give rise, owing to the great depth of the connecting channel, to a return current which passes underneath the forward current from the drawing chamber toward the refining chamber. This return current forms an effective thermal insulation for the lower boundary of the forward current which feeds the ribbon of glass to be drawn from the melt. Thus, with the conventional type of apparatus referred to, the current feeding the emerging glass sheet is cooled only at it free upper surface so that the formation of a relatively viscous skin is limited to that surface of the current. This means that the far side of the sheet, as seen from the refining chamber, is constituted by a considerably more fluid viscous mass so that the drawing process is retarded.

The general object of my present invention is to provide a process and means for the drawing of flat glass at increased efficiency due to the elimination of the aforementioned return current. This is accomplished in accordance with one of the features of my invention, by limiting the depth of the connecting channel in such manner that the glass can flow only in the forward direction. I have found that, because of friction along the channel walls, the distance of the channel bottom from the melt surface may in fact range between approximately 10 and 30 cm. or about 4 and 12 inches. The lesser depth corresponds to the case where the refining chamber is of reduced length and where, accordingly, the glass mass entering the connecting channel has a more elevated temperature, usually around 1,350° C.; the greater depth is applicable to an apparatus where the refining chamber is of normal length so that the glass temperature at the exit of that chamber is lower, e.g. around 1,250° C.

A more particular object of my invention is to provide a process and means for so controlling the cooling of the glass flow as to produce a second viscous skin which constitutes the distal layer of the drawn sheet whereby greater uniformity of the product and acceleration of the drawing operation are realized. I achieve this, in a connecting channel so dimensioned as to suppress the return current, by so cooling the underside of the channel that the heat losses thereat approximate those to which the upper surface of the glass mass in this channel is subjected. Under these conditions there is formed, within the lower reaches of the connecting channel, a second viscous skin similar to that at the surface, i.e. to the single skin produced by the conventional processes. Thus the mass of the glass entering the drawing chamber finds itself sandwiched between two relatively viscous layers which can easily be further consolidated by the usual surface coolers at the draw point to form a pair of exceptionally tough membranes at the two faces of the ribbon or sheet drawn from the bath. These two membranes, merging into the sheet at its base, can be extracted from the bath at high speed and will entrain between them a mass of relatively fluid, markedly hotter material from the central region of the channel. This enables the drawing operation to be performed at a considerably faster rate than is possible with known systems.

I have determined that with the present improvement an increase in drawing speed of at least 40% and in some cases as much as 60%, compared with conventional production methods, can be realized without any modification of the cooling system normally provided at the drawing chamber.

More specifically, in accordance with a further feature of my invention, I have found that best results are obtained if both the top and the bottom of the channel are simultaneously cooled in such manner as to provide a temperature drop exceeding, on the average, 100° C. per meter. It is, therefore, an ancillary object of the present invention to provide simple and effective means for producing such temperature drops without unduly retarding the flow of the glass mass from the refining chamber to the drawing chamber. This object is realized, in accordance with still another aspect of the invention, by the provision of means for facilitating the transfer of heat from the bath to its surroundings at both the top and the bottom of the connecting channel, in combination with means for thermally insulating the lateral channel walls to minimize the heat loss therethrough.

Since it is desirable to maintain the entrance temperature of the drawing chamber at a value above 1,000° C., usually around 1,050° C., the connecting channel will be considerably foreshortened in comparison with known apparatus designed for temperature drops of approximately 20° to 50° C. per meter. With a glass temperature of 1,350° C. at the channel inlet and 1,050° C. at the channel outlet, for example, the length of the channel should be not more than 3 meters or approximately 10 feet; with inlet temperatures of 1,250° C., the maximum channel length should be reduced to 2 meters or approximately 7 feet. Further shortening will of course be necessary if, to increase the withdrawal rate, cooling is intensified to afford a temperature differential of, say, 150° C. per meter. It may be mentioned, in this connection, that an inlet temperature of the order of 1,250° C. is preferred since the tendency of the gas stream to form bubbles is reduced under these conditions.

Other objects, features and advantages of my invention will be apparent from the following detailed description of certain embodiments, given with reference to the accompanying drawing. In this description, reference will be had to the application of the present improvement to a process of the Libby-Owens type, yet it is to be understood that the invention also lends itself to systems in which the glass mass is drawn from the slot of a piece of refractory material immersed in the bath. In the drawing.

Figure 1:
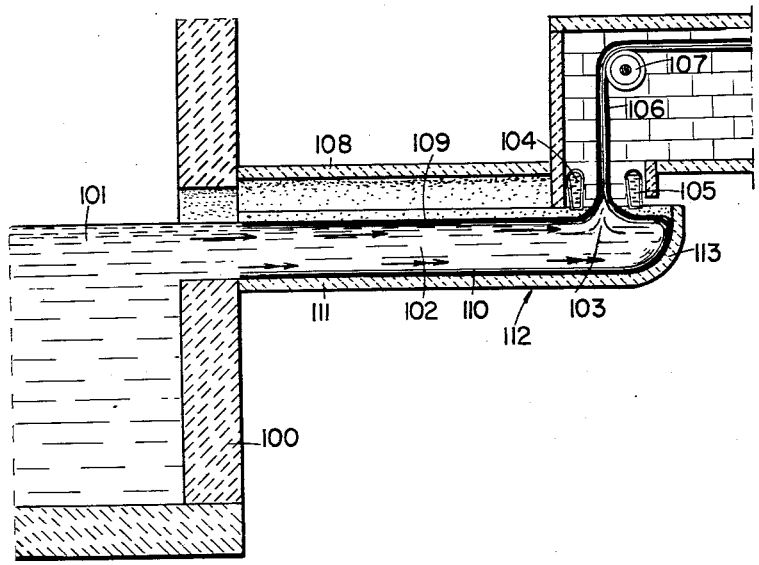
FIG. 1 shows, in longitudinal section, the principal parts of a Libby-Owens-type glass-drawing apparatus embodying the invention.

FIG. 1 shows a tank furnace 100 containing a melt 101 whose temperature, as previously noted, may range between approximately 1,250 and 1,350° C. A trough 112, whose end 113 remote from tank furnace 100 constitutes a drawing chamber, forms a channel for molten glass 102 flowing toward the base 103 of a sheet which is drawn in the usual manner, by means of rollers 107 (only one illustrated), toward an annealing lehr not shown. Conventional cooling boxes 104, 105 extend on opposite sides of the sheet 106 above the bath surface.

The roof 108 of the channel is high enough above the bath surface to provide a cooling space into which heat from the bath may radiate to provide the desired temperature drop which will result in the formation of a relatively viscous skin 109 atop the bath, this skin being drawn toward zone 103 in the direction of the simple arrows to form the proximal (left-hand) layer of sheet 106. The bottom 111 of trough 112 is thin enough to afford similar cooling to the underside of mass 102, thereby resulting in the formation of a skin 110 whose sense of travel has been indicated by the two-headed arrows and which eventually becomes the distal (right-hand) layer of sheet 106. Between these two layers there is sandwiched a further layer which is drawn from the hotter central zone of the glass flow 102, the entire sheet 106 being rapidly solidified by the action of the coolers 104 and 105.

If the bottom wall 111 of the trough 112 were of thermally insulating material as has heretofore been the practice, the lower zones of the glass flow 102 would have a temperature exceeding that of its surface by about 25° to 50° C.; under these circumstances the skin 110 would not be formed and, for a given sheet thickness, the rate of drawing of the glass sheet from the bath would have to be materially reduced. In a system according to the invention, on the other hand, the entrainment of the fluid mass between two films of elevated viscosity insures full utilization of the capacity of supply channel 112.

Figure 2:
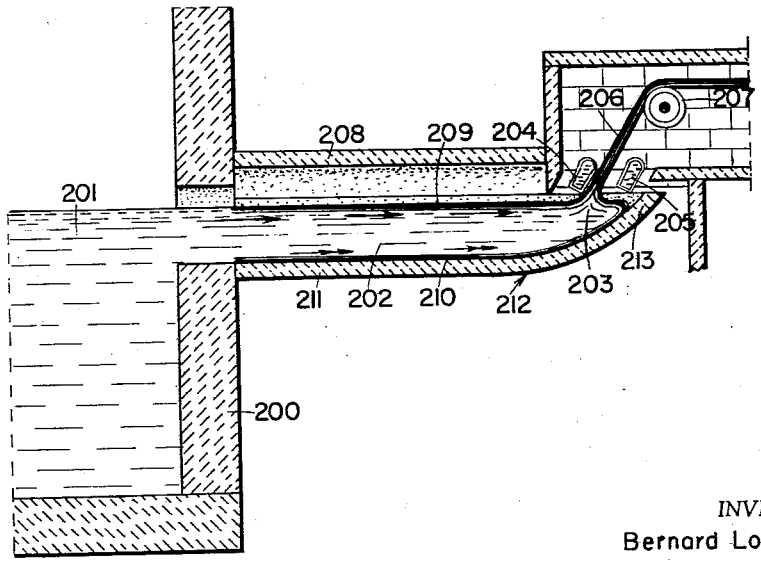
FIG. 2 is a view similar to FIG. 1, showing a modification.

The apparatus of FIG. 2 is generally similar to that of FIG. 1 and comprises a tank furnace 200 with melt 201, a supply channel formed by a trough 212 whose end portion 213 constitutes a drawing chamber, a roof 208 above the supply channel, a roller 207 for the drawing of a sheet 206, and a pair of coolers 204, 205 positioned on opposite sides of the sheet base 203. The bottom of the drawing chamber is, however, curved upwardly, in the manner described in French Patent No. 1,159,183, to cause a progressive decrease in the cross section of the glass flow 202; with the roller 207 positioned to draw the sheet 206 on a slope rather than vertically upwardly, the change of direction of both skins 209 and 210 in the region of base 203 will be less abrupt so that the formation of the sheet proceeds more smoothly.

Figure 3:
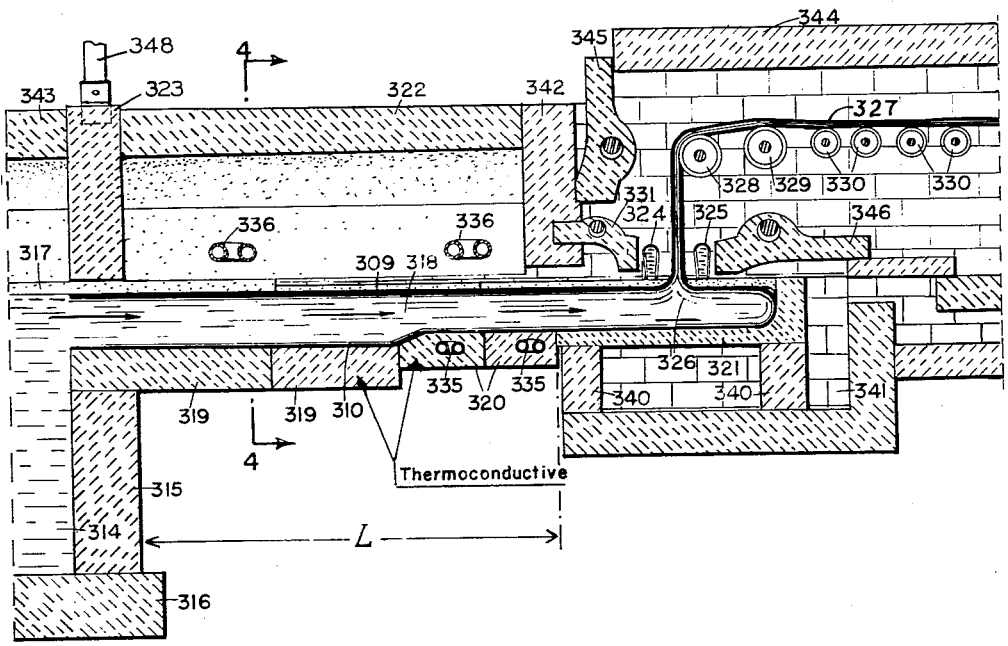
FIG. 3 illustrates, again in longitudinal section, still another embodiment.
Figure 4:
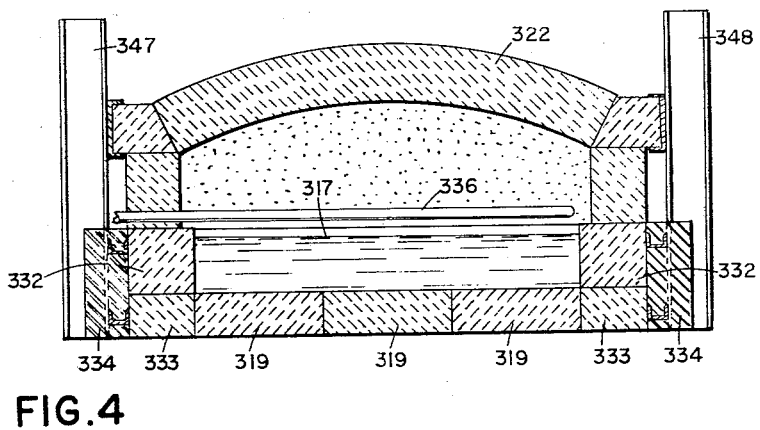
FIG. 4 is a cross-sectional view taken on the line IV—IV of FIG. 3.

In FIGS. 3 and 4 I have shown a more elaborate apparatus according to the invention generally similar to that of FIGS. 1 and 2. The melt 314, whose level has been indicated at 317, is contained in a tank furnace with side and bottom walls 315, 316 opening into a supply channel which is formed by bottom tiles 319 and 320, side blocks 332 and corner stones 333, as well as thermal insulation 334 alongside the bricks 332 and 333. The drawing chamber at the end of the supply channel is constituted by a further block 321 which rests on stools 340 and is surrounded by the chamber 341 having the usual heating means (not shown) for maintaining the bath at the proper temperature. The tiles 320, which are at a higher level than the adjoining tiles 319 to reduce the depth of the supply channel, are shown traversed by tubes 335 serving for the circulation of a cooling fluid; similar tubes 336 extend above the bath 318 in the supply channel within the cooling space provided by the roof 322. It will be understood that the tubes 335, 336 may be omitted, or held inactive, if the temperature differential along the channel is to be maintained at or near its recommended lower limit. Refractory partitions 323 and 342 separate the space under roof 322 from the furnace chamber underneath an adjacent roof 343 and from the drawing chamber whose roof has been indicated at 344. The latter chamber, also comprising lip tiles 331, 345 and 346, contains coolers 324 and 325, a deflecting roller 328, a transport roller 329 and several support rollers 330 for the sheet 327. The roof structure is supported by I-beams 347, 348.

With proper dimensioning of the supply channel and suitable cooling as has been described, the vitreous mass 318 within that channel will flow in its entirety in the direction of the arrows and will form two relatively viscous skins or films 309, 310 merging at the base 326 into the sheet 327.

Advantageously, the bottom tiles 319, 320 of the flow channel (as well as analogous parts in FIGS. 1 and 2) are made of electro-fused corundum, which has a relatively elevated thermal conductivity, while the bricks 332, 333, the drawing chamber 321 and other refractory members of the assembly may consist of aluminosilicate. In a specific embodiment which has been successfully tested, the tiles 319 as well as the roof 322 had a thickness of about 20 cm., or approximately 8 inches, compared with a customary thickness of 30 cm. (12 inches) for the refractory walls 315 and 316 of the tank furnace. The depth of the channel at its entrance end, measured from the top of tiles 319 to level 317, was 25 cm. or about 10 inches; at its exit end, i.e. above tiles 320 and in the region of drawing chamber 321, this depth was reduced to 18 cm., or about 7 inches. The horizontal length L of the channel, measured from its entrance end to the plane of refractory partition 342, was 250 cm., or approximately 100 inches. With no forced cooling, the glass flow 318 entering the channel underneath partition 323 with a substantially uniform temperature of 1,320° C. was cooled at a rate of 130° C. per meter, its temperature underneath lip tile 331 being 1,060° C. at the surface and 1,065° C. at the bottom. A sheet 327 of 3.5 mm. thickness (approximately 9/64 inch) was drawn at a rate of 120 meters, or about 400 feet per hour.

For purposes of comparison it may be mentioned that in a conventional apparatus of the type referred to, having a supply channel 120 cm. (about 4 feet) deep and a cooling chamber of 45 cm. (1½ feet) depth at the end of such channel, the production rate for a sheet of like thickness is of the order of 80 meters, or about 270 feet per hour; thus the present improvement results in an acceleration of 50% in relation to this particular system.

My invention is, of course, not limited to the specific embodiments described and illustrated but may be realized in various modifications and adaptations without departing from the spirit and scope of the appended claims.

I claim:

1. A process for producing flat glass, comprising the steps of refining glass in a tank furnace, passing molten glass from said tank furnace to a drawing chamber through an elongated, substantially horizontal cooling channel, limiting the depth of flow in said channel sufficiently to prevent the occurrence of a return flow toward said tank furnace upon the drawing of a sheet of glass from the melt in said drawing chamber, cooling the upper part of the flow in said channel at an average rate exceeding approximately 100° C. per meter so as to form a first skin of relatively viscous molten glass on the surface of said flow and simultaneously cooling the lower part of said flow at substantially the same rate so as to form a second skin of relatively viscous molten glass at the underside of said flow, thereby entraining between said skins a mass of relatively fluid, hotter material in the central region of said flow, and drawing said sheet of glass with said first and second skins constituting respectively a proximal and a distal layer of said sheet.

2. A process according to claim 1 wherein the temperature of the melt is substantially 1,050° C. at the end of said flow in both an upper and a lower zone of said flow, the temperature difference between said zones being not more than approximately 10° C.

3. A process for producing flat glass, comprising the steps of refining glass in a tank furnace, passing molten glass from said tank furnace to a drawing chamber through a substantially horizontal cooling channel having a minimum length of about one meter, limiting the depth of flow in said channel to a maximum of substantially 30 cm. to prevent the occurrence of a return flow toward said tank furnace upon the drawing of a sheet of glass from the melt in said drawing chamber, cooling the upper part of the flow in said channel at an average rate exceeding approximately 100° C. per meter so as to form a first skin of relatively viscous molten glass on the surface of said flow and simultaneously cooling the lower part of said flow at substantially the same rate so as to form a second skin of relatively viscous molten glass at the underside of said flow, thereby entraining between said skins a mass of relatively fluid, hotter material in the central region of said flow, and drawing said sheet of glass with said first and second skins constituting respectively a proximal and a distal layer of said sheet.

References Cited in the file of this patent

UNITED STATES PATENTS

| | | |
|---|---|---|
| 1,489,875 | Whittemore | Apr. 8, 1924 |
| 1,554,269 | Ferngren | Sept. 22, 1925 |
| 1,557,148 | Ferngren | Oct. 13, 1925 |
| 1,586,619 | Ferngren | June 1, 1926 |
| 1,759,235 | Mambourg | May 20, 1930 |
| 2,043,029 | Blau et al. | June 2, 1936 |
| 2,173,345 | Spinasse | Sept. 19, 1939 |
| 2,226,701 | Benner et al. | Dec. 31, 1940 |